United States Patent [19]

Rylatt

[11] 4,080,255

[45] Mar. 21, 1978

[54] HORIZONTAL BAFFLE FOR NUCLEAR REACTORS

[75] Inventor: John A. Rylatt, Monroeville, Pa.

[73] Assignee: The United States of America as represented by the United States Department of Energy, Washington, D.C.

[21] Appl. No.: 719,318

[22] Filed: Aug. 31, 1976

[51] Int. Cl.² .............................................. G21C 15/22
[52] U.S. Cl. ....................................... 176/87; 176/40; 176/61
[58] Field of Search ....................... 176/40, 50, 60, 64, 176/65, 87, 61

[56] References Cited

U.S. PATENT DOCUMENTS

| 3,192,120 | 6/1965 | Campbell | 176/61 X |
|---|---|---|---|
| 3,211,621 | 10/1965 | Creagan | 176/65 X |
| 3,802,992 | 4/1974 | Griffith et al. | 176/61 X |
| 3,964,966 | 6/1976 | Lampe | 176/40 X |
| 4,001,079 | 1/1977 | Rylatt | 176/40 X |

Primary Examiner—Peter A. Nelson
Attorney, Agent, or Firm—L. A. DePaul; Z. L. Dermer

[57] ABSTRACT

A horizontal baffle disposed in the annulus defined between the core barrel and the thermal liner of a nuclear reactor thereby physically separating the outlet region of the core from the annular area below the horizontal baffle. The horizontal baffle prevents hot coolant that has passed through the reactor core from thermally damaging apparatus located in the annulus below the horizontal baffle by utilizing the thermally induced bowing of the horizontal baffle to enhance sealing while accommodating lateral motion of the baffle base plate.

15 Claims, 6 Drawing Figures

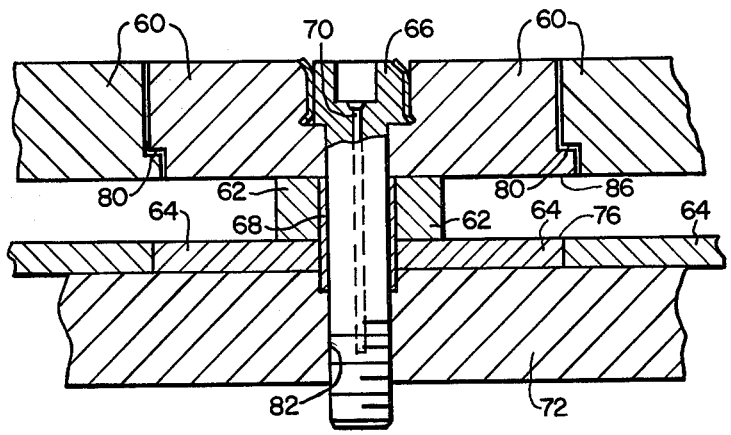
FIG. 3.
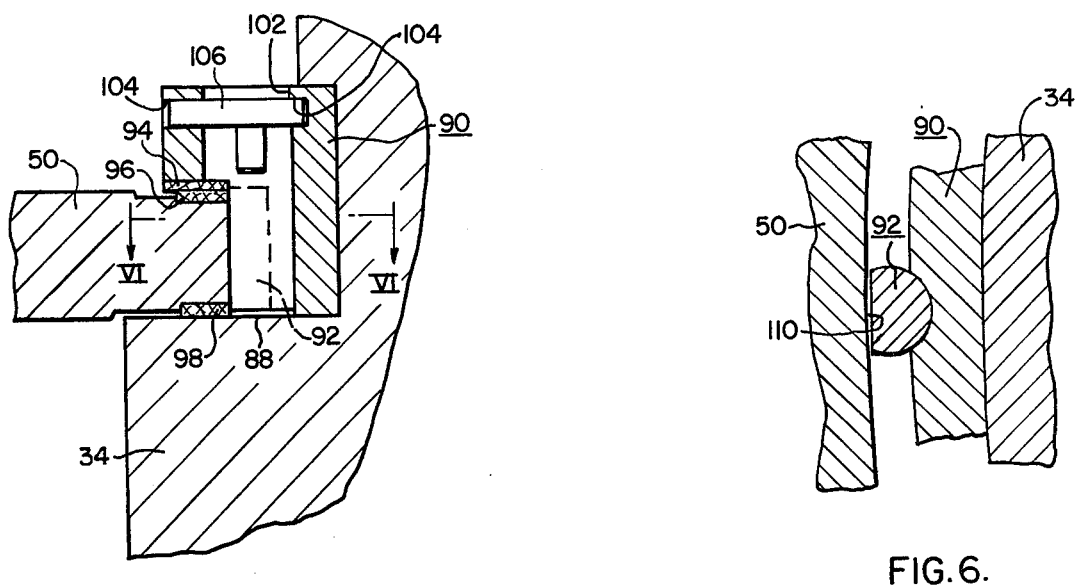
FIG. 5.
FIG. 6.

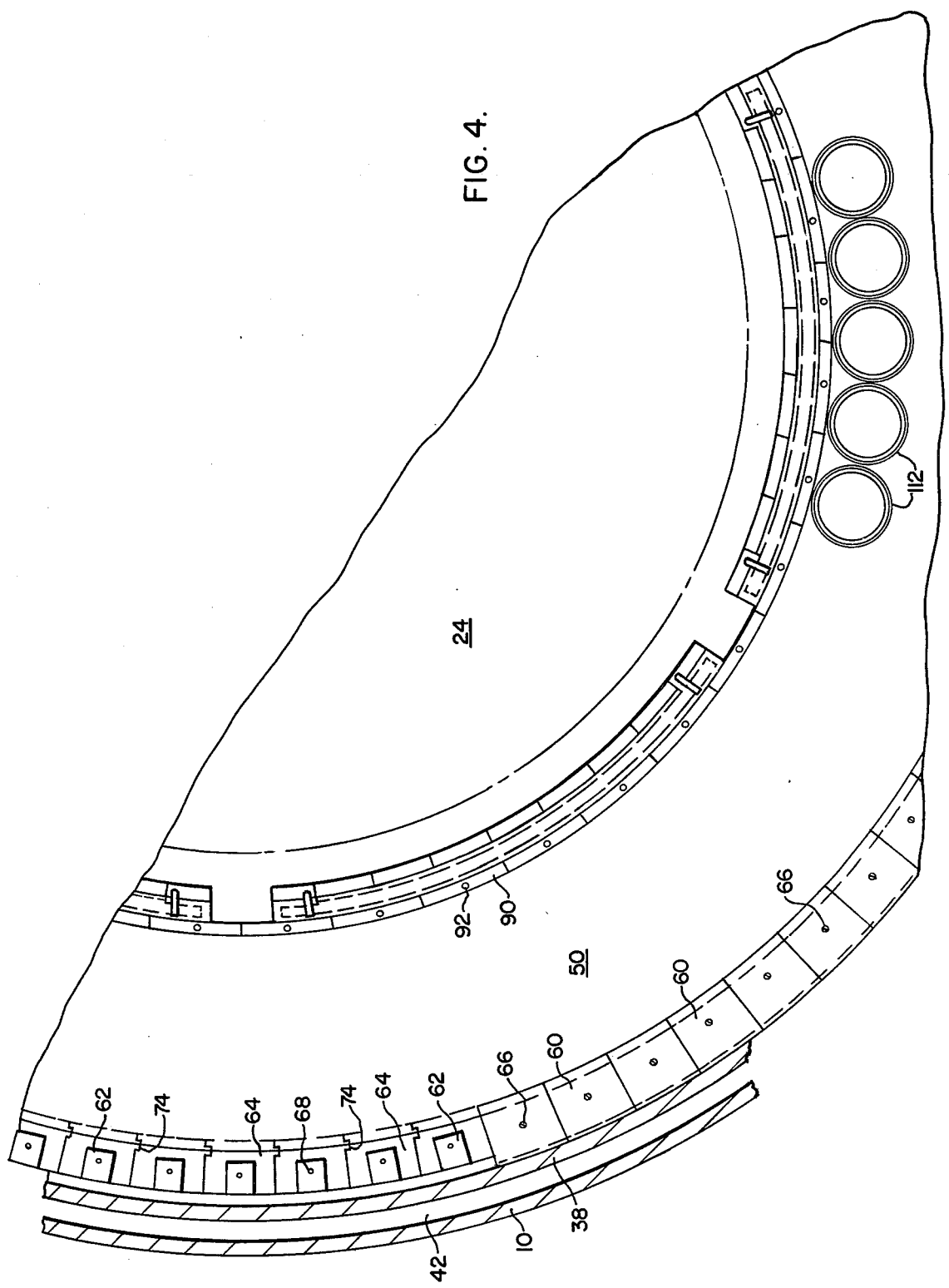

HORIZONTAL BAFFLE FOR NUCLEAR REACTORS

GOVERNMENT CONTRACT

The invention described herein was made in the course of, or under, contract No. E(11-1) 2395 with the United States Energy Research and Development Administration.

CROSS-REFERENCE TO RELATED APPLICATIONS

The invention herein described is related to U.S. Pat. No. 4,001,079 filed Aug. 15, 1975, entitled "Thermal Baffle For Fast-Breeder Reactor", by J. A. Rylatt.

BACKGROUND OF THE INVENTION

The invention relates to nuclear reactors and more particularly to horizontal partitions of nuclear reactors that prevent thermally induced damage to internal structures of the reactor.

In designs of nuclear reactors that are well known in the art, the reactor includes a reactor vessel having an inlet and an outlet with a closure head disposed on the top thereof. A core disposed within the reactor vessel consists of an array of fuel assemblies containing nuclear fuel which produce heat in a commonly understood fashion. The fuel assemblies are supported at their lower end by a lower core plate and at their upper end by an upper core plate while a cylindrical metal member with an open top and bottom, known as a core barrel, surrounds the array of fuel assemblies. The outer surface of the core barrel together with the inner surface of the reactor vessel define an annular passage therebetween. The lower core plate is supported within the reactor core by a support structure attached to the inner wall of the reactor vessel in a manner to support the core within the reactor vessel. During reactor operation a coolant which in a fast breeder reactor may be liquid sodium is circulated through the reactor vessel passing in heat transfer relationship with the fuel assemblies thereby removing the heat produced by the fuel assemblies and carrying the heat to electrical generating equipment as is well known in the art.

In its circulation through the reactor vessel, the coolant flows into the reactor vessel through an inlet which may be located below the core near the bottom of the reactor vessel and enters an inlet plenum defined below the core. From the inlet plenum, the coolant flow separates into two paths; one passing through the core and the other passing through the annular passage around the core. The coolant following the path through the core enters the fuel assemblies near their lower end, passes in heat transfer relationship with the fuel assemblies thereby greatly raising the temperature of the coolant, and exits the fuel assemblies near their upper end flowing into an outlet plenum located above the core. In order to maintain the reactor vessel at a reasonable temperature, the other coolant path is traced through the annular passage around the core and into the outlet plenum where it mixes with the coolant that has passed through the core. This other coolant path is sometimes referred to as by-pass flow path. From the outlet plenum the coolant exits the reactor vessel through an outlet on the reactor vessel.

A problem associated with this arrangement occurs when the hot coolant that has passed through the core does not flow directly to the outlet on the reactor vessel, but rather flows non-uniformly from the outlet plenum of the core down the annular passage and comes into contact with the core support structure, the outer surface of the core barrel, and other related structures. The difficulty with this situation is that having been cooled by the by-pass flow of cooler coolant passing through the annular passage, the core support structure, the outer surface of the core barrel, and other related structures are at a much lower temperature than the coolant that has passed through the core. Therefore, the contact of the hot coolant with the cooler structures creates unacceptable thermal stresses in those structures. Furthermore, the contact of the hot coolant with those structures may not be continuous but may be cyclical which may lead to thermal fatigue of those structures. As a result it is necessary to prevent the hot coolant that has passed through the core from flowing in a reverse manner down the annular passage.

One method that attempts to prevent such a reverse flow is the device scheduled for use in the Fast Flux Test Facility (FFTF) which is under construction in the State of Washington. The FFTF device consists of an annular barrier supported on its underside and disposed in the annular passage between the core barrel and reactor vessel so as to substantially close the annular passage. However, the annular barrier is not sealed to the reactor vessel so that a reduced by-pass flow between the annular passage and the core outlet plenum, nevertheless, results. Flow experiments for FFTF indicate that flow instabilities and variable pressure distributions may exist in the outlet plenum which may induce oscillating flow patterns near the annular barrier. Since the annular barrier is not sealed to the reactor vessel, the variable flow patterns may cause, alternately, the flow of hot coolant and the cooler by-pass coolant across the edges of the annular barrier than are not sealed, resulting in high thermal stresses in the annular barrier that are not acceptable for common materials. Due to the size of the annular barrier and the severe environment in which it is placed, state of the art seals are not appropriate for use in preventing this alternate flow characteristic. Because state of the art seals may not be used, the FFTF device anticipates the use of Inconel as a suitable material capable of existing in such an environment, but Inconel is expensive and an undesirable material for such an application.

Another device that attempts to solve this problem is the one described in U.S. Pat. No. 4,001,079 filed Aug. 15, 1975, entitled "Thermal Baffle For Fast-Breeder Reactor", by J. A. Rylatt. The Rylatt patent describes a thermal baffle that includes an annular austenitic stainless steel baffle plate extending from the core barrel to the thermal liner of the reactor vessel. The baffle plate has on its lower surface inner and outer circumferential webs with radial webs extending between the circumferential webs and has on its upper surface insulation consisting of an austenitic stainless steel plate that attempts to maintain the baffle plate at a uniform temperature. At its inner support, the baffle plate is keyed to the core barrel while at its outer support the baffle plate rests on ledges of the thermal liner. In addition, flex seals are provided at each end in an attempt to minimize alternate flow thereacross. While the flex seals may prevent some alternate flow across the baffle plate on its lower side, the flex seals do not extend over the upper edge of the baffle plate leaving such upper edge exposed to alternate flow which thereby creates the possibility of thermal fatigue thereof.

SUMMARY OF THE INVENTION

A horizontal baffle disposed in the annulus defined between the core barrel and the thermal liner of a nuclear reactor thereby physically separating the outlet region of the core from the annular area below the horizontal baffle. The horizontal baffle consists of an annular metal base plate with mechanisms to provide attachment at both its inner and outer ends. At its inner end near the core barrel, the base plate is held in place by a base plate restraint key that restrains the base plate. At its outer end near the thermal liner, the base plate is restrained and supported by a base plate clamp that also accommodates lateral motion of the base plate. Because the temperature above the base plate is considerably higher than that below it, the thermal gradient across the base plate induces a substantial thermal bowing therein which increases the contact between the base plate and the base plate restraint key and between the base plate and the base plate clamp thus enhancing the sealing effect of such an interconnection. Thus the horizontal baffle prevents hot coolant that has passed through the core from thermally damaging structure located in the annulus below the horizontal baffle by utilizing the thermally induced bowing of the base plate to enhance sealing while accommodating lateral motion at its outer end.

It is an object of this invention to provide a physical partition in the annulus between the core barrel and thermal liner that utilizes thermal bowing to enhance sealing thus preventing contact of the hot coolant on the cooler structural members in the annulus below the partition.

It is a more particular object of this invention to provide a physical partition in the annulus between the core barrel and thermal liner that utilizes thermal bowing to enhance sealing while protecting the edges of the physical partition from alternate flow characteristics that may induce thermal fatigue in the physical partition.

BRIEF DESCRIPTION OF THE DRAWINGS

While the specification concludes with claims specifically pointing out and distinctly claiming the subject matter of the invention it is believed the invention will be better understood from the following description taken in conjunction with the accompanying drawings, wherein:

FIG. 3 is a cross-sectional view in elevation taken along line III—III of FIG. 2;

FIG. 4 is a plan view of the horizontal baffle;

FIG. 5 is a detailed cross-sectional view in elevation of the inner support of the horizontal baffle; and FIG. 6 is a cross-sectional view taken along line VI—VI of FIG. 5.

DESCRIPTION OF THE PREFERRED EMBODIMENT

In common designs of nuclear reactors and particularly liquid metal fast breeder reactors, the reactor coolant flowing through the reactor may be split into two flow paths, one passing through the core and the other passing around the core through the by-pass annulus defined between the core barrel and reactor vessel. Since the coolant passing through the core becomes much hotter than the coolant flowing through the by-pass annulus, the hot coolant must be prevented from flowing in a reverse manner down the by-pass annulus because such hot coolant could cause undesirably high thermal stresses in support structure located in the by-pass annulus due to alternating flow patterns of the hot coolant and the by-pass flow coolant. The invention, herein disclosed, provides an apparatus for preventing such alternating flow patterns.

Figure 1:
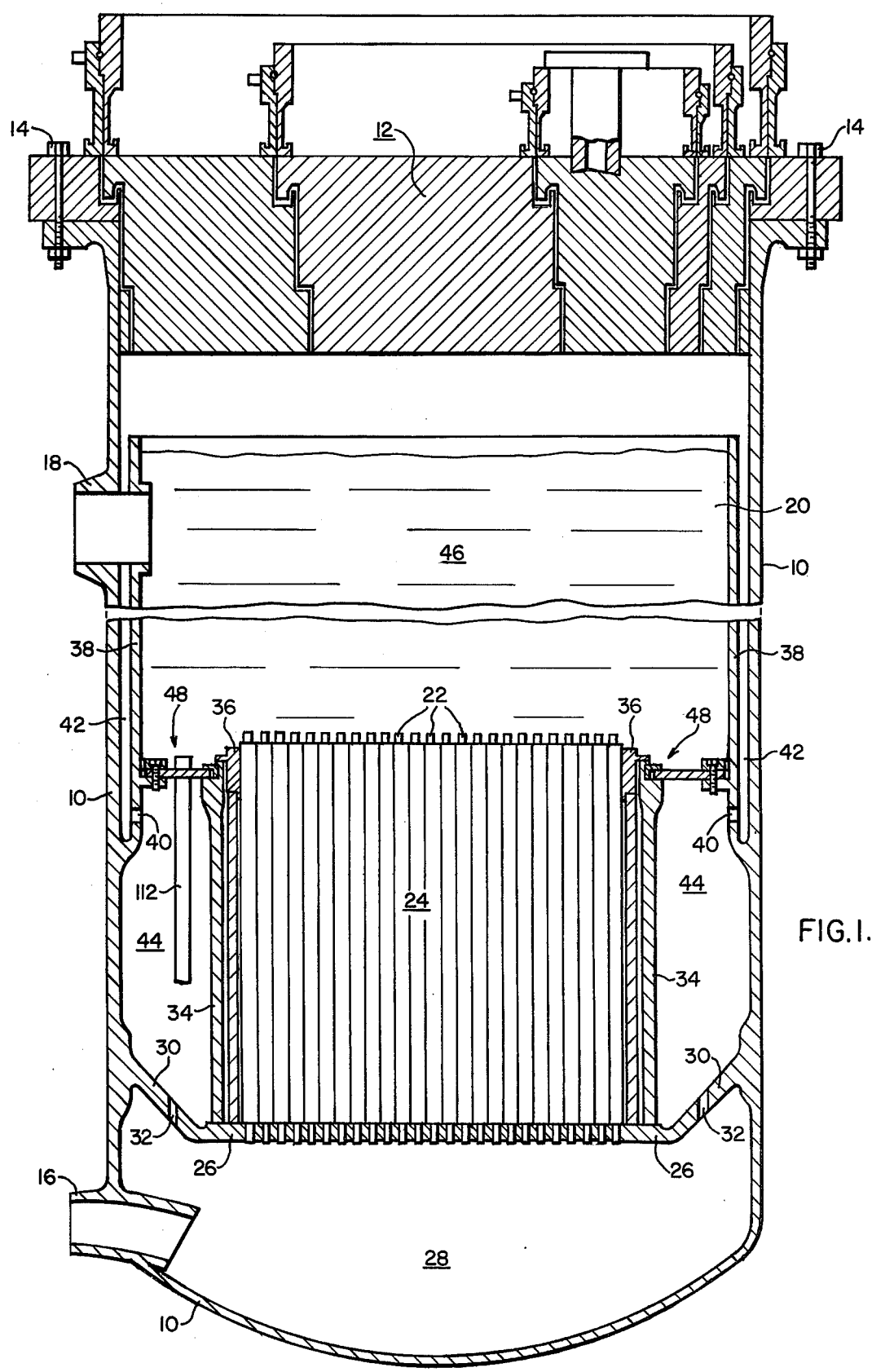
FIG. 1 is a cross-sectional view in elevation of a nuclear reactor.

Referring to FIG. 1, a reactor vessel 10 and a closure head 12 attached to the top thereof by suitable means such as bolts 14 serves to isolate the reactor internals from the environment external to reactor vessel 10. Reactor vessel 10 has an inlet 16 and an outlet 18 for the circulation therethrough of a coolant 20 which in a fast breeder reactor may be liquid sodium. Fuel assemblies 22 containing nuclear fuel are arranged within reactor vessel 10 in an array generally referred to as core 24 so as to provide heat in a commonly understood manner. Fuel assemblies 22 may be supported at their lower end by lower core plate 26 which is a circular piece of metal having holes therein for accommodating the lower ends of fuel assemblies 22. The lower ends of fuel assemblies 22 extend through the holes in lower core plate 26 into inlet plenum 28 which is the plenum defined between lower core plate 26 and the bottom of reactor vessel 10 and which accepts the flow of coolant 20 from inlet 16. Lower core plate 26 is supported by core support 30 which is a substantially conical member attached at one end to lower core plate 26 and at its other end to reactor vessel 10. Core support 30 has holes 32 therein that allow coolant, known as by-pass flow coolant, to flow from inlet plenum 28 through holes 32 thus avoiding flow through core 24 in order to cool reactor vessel 10. A core barrel 34 which is a substantially cylindrical metal member encloses fuel assemblies 22 and is attached at its lower end to lower core plate 26. A core former 36 which is a device to maintain alignment of the top ends of fuel assemblies 22 is attached to the upper end of core barrel 34. Core barrel 34, core former 36, and lower core plate 26 act to support and maintain proper alignment of fuel assemblies 22 of core 24.

Still referring to FIG. 1, thermal liner 38 which is a substantial cylindrical metal member is attached at its lower end to reactor vessel 10 while its upper end remains free. Thermal liner 38 has openings 40 therein that allow by-pass coolant to enter thermal liner annulus 42 which is the annulus defined between reactor vessel 10 and thermal liner 38. In addition, by-pass annulus 44 is defined between core barrel 34 and thermal liner 38 and reactor vessel 10. Coolant 20 enters reactor vessel 10 through inlet 16 and flows into inlet plenum 28. From inlet plenum 28, coolant 20 splits into two flow paths, the greater portion of the coolant passing through the core coolant path while the remainder flows through the by-pass flow path. The coolant 20 that flows through the core coolant path enters the lower end of fuel assemblies 22 that extend into inlet plenum 28, flows upwardly through fuel assemblies 22 in heat transfer relationship therewith and exits fuel assemblies 22 at their upper end into outlet plenum 46 located above core 24. The coolant exiting core 24 in this manner attains a very high temperature sufficient to produce steam as is well understood in the art. The by-pass flow exits inlet plenum 28 through holes 32 and enters by-pass annulus 44. From by-pass annulus 44, the by-pass flow passes through openings 40 into thermal liner annulus 42 and from thermal liner annulus 42 into outlet plenum 46. The by-pass flow provides a means to cool the support structure of core 24 and the inner wall of reactor vessel 10 while the core coolant provides a means to cool core 24. Both the core coolant and by-pass flow mix together in outlet plenum 46 and proceed through outlet 18 to steam generating equipment to produce electricity in a manner well understood in the art. To accomplish the above described flow pattern and to prevent the hot core coolant from flowing down by-pass annulus 44 thereby preventing thermal stress damage to structure located in by-pass annulus 44, horizontal baffle 48 is attached to thermal liner 38 and to core barrel 36 near the top of by-pass annulus 44.

Figure 2:
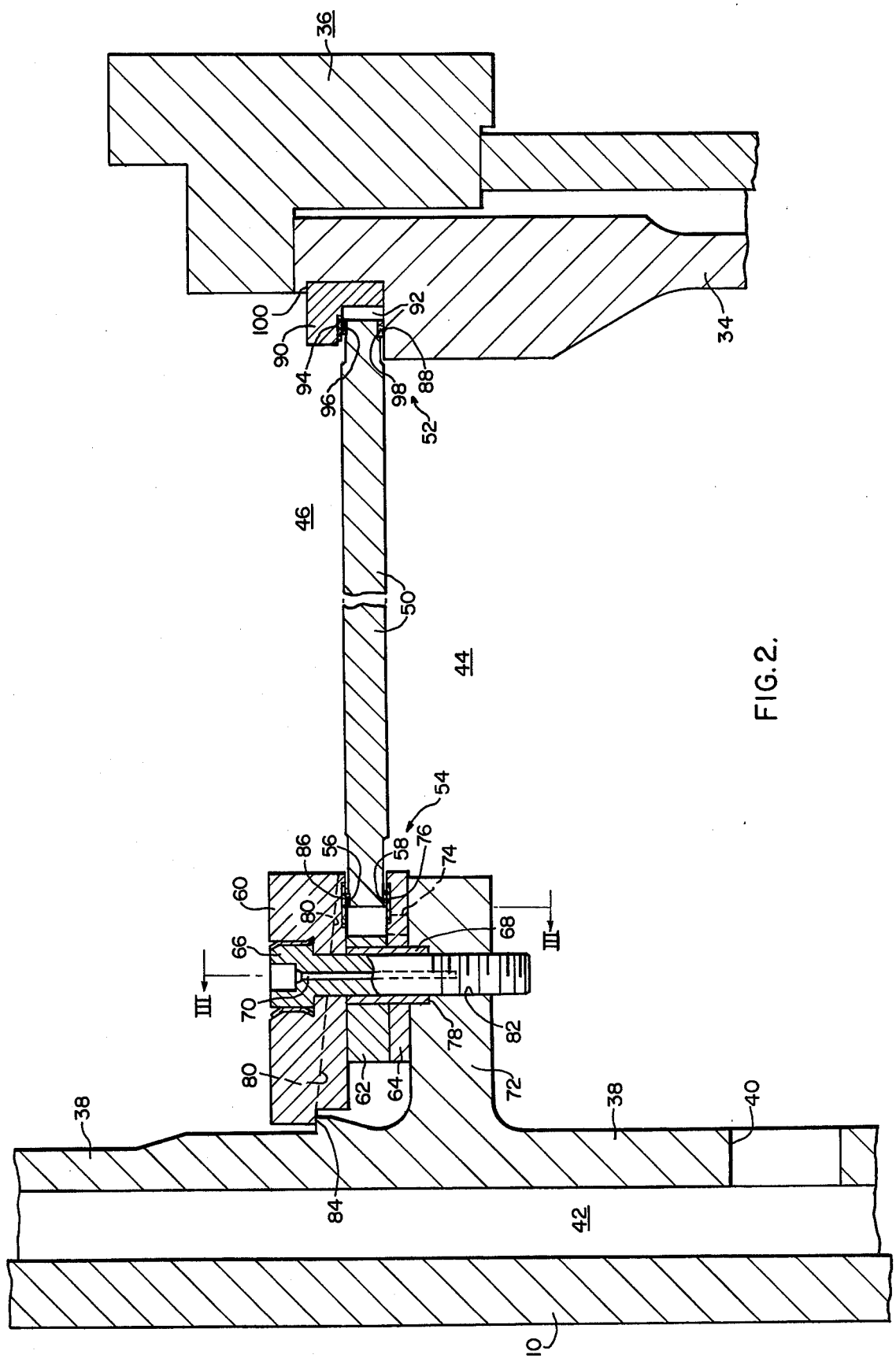
FIG. 2 is a cross-sectional view in elevation of the horizontal baffle.

Referring now to FIG. 2, horizontal baffle 48 comprises base plate 50, an inner support 52, and an outer support 54. Base plate 50 is an annular metal plate that extends around the entire by-pass annulus 44 and is supported at its inner end by inner support 52 and at its outer end by outer support 54. Base plate 50 may comprise several pieces of 1.5 inch thick 316 stainless steel annular plates welded together to form a single annular plate or may be a single annular piece which in either case may weigh approximately 7500 pounds. The ends of base plate 50 have a thickness slightly less than that of the main portion of base plate 50 so that bending the base plate 50 may be accommodated by inner support 52 and outer support 54 without developing excessive loading on either. The outer end of base plate 50 has an upper surface 56 and a lower surface 58 which are hard surfaced with weld deposited Haynes 273 wear resistant surface to increase their ability to withstand wear.

Referring now to FIGS. 2 and 3, outer support 54 comprises a base plate clamp 60, spacer 62, base plate support 64, cap screw 66, tube section 68 and heater hole 70 for a heater element (not shown). Thermal liner 38 has a flange 72 for supporting outer support 54 therefrom. Base plate supports 64 having holes therein for accommodating tube section 68 and cap screw 66 are segmented plates of 5° circumferential arc with a single projecting rectangular tab 74 which fits closely into a slot in the adjacent base plate support as shown in FIG. 4. Tabs 74 are closely toleranced to provide the sealing required to minimze flow from by-pass annulus 44 into outlet plenum 46. Tabs 74 are located under the sealing edge of base plate 50 at the hard surfaced diameter thereof to provide the most effective seal. Base plate support 64 is supported by flange 72 and has a hardened surface 76 of weld deposited Haynes 273 that corresponds to lower surface 58 of base plate 50 so that lower surface 58 and harded surface 76 may interact without causing excessive wear on either. Base plate support 64 is segmented rather than solid, to prevent large thermal hoop stresses therein which would be caused by the temperature difference between full rings and flange 72. Spacers 62 also being segmented plates each having a hole therein for accommodating tube section 68 are mounted on base plate supports 64 such that their respective holes are in collinear alignment so that tube section 68 may fit through the holes into recessed portion 78 of flange 72 thereby maintaining such collinear alignment for ease of assembly. Base plate clamps 60, segmented plates of 5° circumferential arc with overhanging beveled ledge 80 and having a bore for accommodating cap screw 66, are mounted on spacers 62 such that cap screw 66 may be placed through base plate clamp 60, spacer 62, base plate support 64, tube section 68, and screwed into a threaded bore 82 of flange 72.

The threads of bore 82 are designed such that they are stronger than the threads of cap screw 66 so that accidental overloading of cap screws 66 during installation will result in a screw failure and not a flange thread failure. Each cap screw 66 has a heater hole 70 therein for a heater element. Such an electrical heater element which may be chosen from those well known in the art, may be used to obtain thermal pre-load extension of cap screw 66 to avoid inducing torsional stresses in cap screw 66 when loaded. Although cap screws 66 may be threaded directly into threaded bore 82 of flange 72, as an alternative, a nut may be used under flange 72 to hold cap screw 66 in a manner well known in the art. The outer edge of beveled ledge 80 fits in close proximity on thermal liner ledge 84 when cap screw 66 is tightened down on base plate clamp 60. Furthermore, the adjacent base plate clamp has a beveled notch cut therein complimentary to the overhanging beveled ledge 80 of the base plate clamp 60 so that the overhanging beveled ledge 80 and the complimentary beveled notch of the adjacent base plate clamp forms a locking mechanism that prevents a base plate clamp 60 from becoming free in the event a cap screw 66 fails. Base plate clamp 60 also has a Haynes 273 wear resistance face 86 that corresponds to upper surface 56 of base plate 50 so that base plate 50 may fit in close proximity into the space between face 86 and hardened surface 76 thereby restraining base plate 50 in the vertical direction while providing a space for accommodating lateral motion or thermal expansion and contraction of base plate 50. Base plate clamp 60 forms a seal at thermal liner ledge 84 that limits the amount of hot coolant contacting members below base plate clamp 60 such as spacer 62 and base plate support 64. In addition, base plate clamp 60 extends over the edge of base plate 50 such that face 86 is directly over upper surface 56 thereby preventing the hot coolant exiting core 24 from contacting the edge of base plate 50 thus preventing thermal damage to base plate 50. Furthermore, while hardened surface 76 may be in contact with lower surface 58, there may be a controlled leakage of by-pass coolant from by-pass annulus 44, through the space between lower surface 58 and hardened surface 76, into the space between the end of base plate 50 and spacer 62, and through the space between upper surface 56 and face 86 into outlet plenum 46. Although the alternate flow of cooler by-pass coolant and the hotter core coolant across the edge of base plate 50 may ordinarily cause thermal damage to such a base plate 50, because base plate clamp 60 extends over the edge of base plate 50 and because the flow of by-pass coolant, due to pressure differences, is always from by-pass annulus 44 to outlet plenum 46 around the edge of base plate 50 as previously described, there is no alternate hot-cold washing of the edge of base plate 50 thereby preventing such thermal damage.

Still referring to FIGS. 2 and 4, inner support 52 comprises core barrel ledge 88, which is a machined ledge of core barrel 34, keys 90 which are "L" shaped members of 9° arc segments and located in the radial gap between base plate 50 and core barrel 34, and pin 92. Key 90 has an under surface 94 of Haynes 273 hard facing that matches a similarly hard faced top face 96 of base plate 50 so that their interaction will not create excessive wear. Also, bottom surface 98 of base plate 50 has a Haynes 273 hardened surface but core barrel ledge 88 is not hard faced. Base plate 50 fits between core barrel ledge 88 and kev 90 such that key 90 acts to restrain the vertical movement of base plate 50 when top face 96 contacts under surface 94. Key 90 is also restrained vertically by core barrel notch 100.

Referring now to FIG. 5, key 90 has a vertical bore 102 therein for accommodating pin 92 and a horizontal bore 104 for accommodating lock pin 106. When pin 92 is placed in key 90 lock pin 106 may be placed into horizontal bore 104 and over the top face of pin 92 thereby locking pin 92 in place in key 90.

Referring now to FIG. 6, a gap 110 is defined between the flat face of pin 92 and the end base plate 50 for accommodating thermal expansion of base plate 50 while preventing extraordinary lateral movement of base plate 50. Gap 110 being about 0.002 inches to 0.005 inches in width effectively restrains base plate 50 at its core barrel 34 interface thereby only permitting lateral motion at its outer end, near thermal liner 38. Pin 92 along with under surface 94, top face 96, and bottom surface 98 maintain a controlled leakage path from by-pass annulus 44 to an outlet plenum 46. In addition, to key 90 which restrains base plate 50 vertically, another restraining key of a typical lock-pin arrangement may be provided at at least one location around the inner circumference of base plate 50 to prevent rotational motion of base plate 50 with respect to core barrel 34.

OPERATION

During reactor operation, the core coolant flowing upwardly through core 24 greatly increases in temperature and flows into outlet plenum 46. However, variable flow patterns may develop in the outlet plenum 46 region such that the hot coolant may flow downwardly toward horizontal baffle 48 where it may contact horizontal baffle 48. At the same time, by-pass coolant flowing upwardly through by-pass annulus 44 flows through openings 40 into thermal liner annulus 42 thereby cooling the core support 30 and reactor vessel 10. This by-pass flow path is established primarily because of the obstruction caused by horizontal baffle 48 in by-pass annulus 44. The contact of the hot coolant at the top of base plate 50 coupled with the contact of the cooler by-pass coolant on the bottom of base plate 50 creates approximately a 150°–200° F temperature difference across base plate 50 causing the center of base plate 50 to rise thereby creating a bowing in base plate 50. In this configuration the small clearance between upper surface 56 and face 86 is reduced while lower surface 58 closely contacts hardened surface 76 thereby increasing the sealing effect thereof. The bowing of base plate 50 also causes its inner end to rise causing top face 96 to more closely contact under surface 94 while bottom surface 98 rises slightly from core barrel ledge 88. The temperature difference across base plate 50 thereby induces a beneficial bowing therein enhancing the capability of base plate 50 to prevent hot coolant that is circulating above it from flowing downwardly thus preventing thermal damage to structure in by-pass annulus 44. It should be noted that in addition to the thermal gradient across base plate 50, a pressure differential of approximately 2 psi is also maintained thereacross to enhance by-pass flow through thermal liner annulus 42. Even with such sealing effectiveness a controlled leakage of approximately 12 percent of the by-pass flow is maintained around the edges of base plate 50 which tends to create a flow of cooler coolant across the edges of base plate 50 thereby reducing the thermal stresses that may be induced therein by the hotter core coolant thereabove. Furthermore, base plate clamp 60 and key 90 extend over the edges of base plate 50 further reducing the possibility of thermal damage to the edges of base plate 50.

While there is described what is now considered to be the preferred embodiment of the invention, it is, of course, understood that various other modifications and variations will occur to those skilled in the art. The claims, therefore, are intended to include all such modifications and variations which fall within the true spirit and scope of the present invention. For example, base plate 50 may have fuel storage ports 112 therein as shown in FIGS. 1 and 4.

I claim:

1. A nuclear reactor including a reactor vessel, a closure head disposed on said reactor vessel, a substantially cylindrical thermal liner attached to the inside of said reactor vessel, a cylindrical vertically disposed core barrel surrounding the core of said nuclear reactor, a bypass annulus defined between said thermal liner and said core barrel, an inlet plenum in the lower portion of said reactor vessel and below said core, an outlet plenum in said reactor vessel above said core, an inlet nozzle located on said reactor vessel communicating with said inlet plenum, an outlet nozzle located on said reactor vessel communicating with said outlet plenum, means for bypassing a relatively low volume of coolant past said core, into, and through said bypass annulus, and a horizontal baffle disposed across said bypass annulus near the top thereof, said horizontal baffle comprising:
   - an annular metal base plate extending from an inner edge near said core barrel to an outer edge near said thermal liner for physically separating said bypass annulus from said outlet plenum;
   - an inner ledge on said core barrel for vertically supporting said inner edge of said base plate;
   - an L-shaped key disposed in a notch of said core barrel and extending over said inner edge of said base plate for vertically restraining said base plate while protecting said inner edge of said base plate from thermal damage; and
   - an outer ledge on said thermal liner for vertically supporting said outer edge of said base plate and protecting the edges of said base plate from thermal damage while accommodating lateal motion of said base plate, said horizontal baffle preventing hot coolant in said outlet plenum from flowing down said bypass annulus by utilizing thermal bowing of said base plate induced by the coolant flow to enhance sealing at its ends thereby protecting structure located in said bypass annulus below said base plate from thermal damage.

2. The nuclear reactor recited in claim 1 wherein said horizontal baffle further comprises:
   a substantially cylindrical pin having one flat side and disposed vertically in a vertical bore in said L-shaped key while having said flat side adjacent to the edge of said base plate for horizontally restraining said base plate.

3. The nuclear reactor recited in claim 2 wherein said horizontal baffle further comprises:
   locking means for maintaining alignment of said L-shaped key and said pin.

4. The nuclear reactor recited in claim 1 wherein said horizontal baffle further comprises:
   clamping means attached to said outer ledge for restraining said base plate while allowing lateral motion and thermal expansion and contraction of said base plate.

5. The nuclear reactor recited in claim 4 wherein said clamping means comprises:
  a segmented metal base plate support having a hole therein and disposed on said outer ledge for vertically supporting said base plate;
  a segmented metal spacer having a hole therein corresponding to the hole in said base plate support and disposed on said base plate support for providing a space for accommodating the outer edge of said base plate;
  a segmented metal base plate clamp extending over the edge of said base plate and having a hole therein corresponding to the hole in said spacer and disposed on said spacer for vertically restraining said base plate while protecting the edge thereof from thermal damage; and
  a cap screw compatible with said base plate clamp, spacer, base plate support, and said outer ledge for maintaining proper alignment of the components, together vertically supporting and restraining said base plate while allowing lateral motion and thermal expansion and contraction of said base plate.

6. The nuclear reactor recited in claim 5 wherein said clamping means further comprises:
  a tube section disposed in said holes in said spacer and said hole base plate support for maintaining their proper alignment during assembly.

7. The nuclear reactor recited in claim 6 wherein said clamping means further comprises:
  a removable heater element disposed in said cap screw for obtaining a pre-load thermal extension of said cap screw to thereby avoid including excessive stresses therein during assembly and service.

8. The nuclear reactor recited in claim 7 wherein said base plate clamp further comprises:
  a beveled overhanging ledge complimentary to a corresponding ledge on the adjacent base plate clamp for interlocking said base plate clamps thereby limiting leakage thereacross and providing additional restraint of said base plate clamps.

9. The nuclear reactor recited in claim 8 wherein said base plate support further comprises:
  a tab complimentary to a slot in the adjacent base plate support for interlocking said base plate supports.

10. The nuclear reactor recited in claim 3 wherein said horizontal baffle further comprises:
  clamping means attached to said outer ledge for restraining said base plate while allowing lateral motion and thermal expansion and thermal contraction of said base plate.

11. The nuclear reactor recited in claim 10 wherein said clamping means comprises:
  a segmented metal base plate support having a hole therein and disposed on said outer ledge for vertically supporting said base plate;
  a segmented metal spacer having a hole therein corresponding to the hole in said base plate support and disposed on said base plate support for providing a space for accommodating the outer edge of said base plate;
  a segmented metal base plate clamp extending over the edge of said base plate and having a hole therein corresponding to the hole in said spacer and disposed on said spacer for vertically restraining said base plate while protecting the edge thereof from thermal damage; and
  a cap screw compatible with said base plate clamp, spacer, base plate support, and said outer ledge for maintaining proper alignment of the components together vertically supporting and restraining said base plate while allowing lateral motion and thermal expansion and contraction of said base plate.

12. The nuclear reactor recited in claim 11 wherein said clamping means further comprises:
  a tube section disposed in said holes in said spacer and said base plate support for maintaining their proper alignment during assembly.

13. The nuclear reactor recited in claim 12 wherein said clamping means further comprises:
  a removable heater element disposed in said cap screw for obtaining a pre-load thermal extension of said cap screw to thereby avoid inducing excessive stresses herein during assembly and service.

14. The nuclear reactor recited in claim 13 wherein said base plate clamp furthe comprises:
  a beveled overhanging ledge complimentary to a corresponding ledge on the adjacent base plate clamp for interlocking said base plate clamps thereby limiting leakage thereacross and providing additional restraint of said base plate clamps.

15. The nuclear reactor recited in claim 14 wherein said base plate support further comprises:
  a tab complimentary to a slot in the adjacent base plate support for interlocking said base plate supports.

* * * * *